(12) United States Patent
Wang

(10) Patent No.: US 10,322,690 B2
(45) Date of Patent: Jun. 18, 2019

(54) RETRACTION BARRIER

(71) Applicant: YEAGLE DEVELOPMENT CO., LTD., New Taipei (TW)

(72) Inventor: Tsung-Hsiang Wang, New Taipei (TW)

(73) Assignee: YEAGLE DEVELOPMENT CO., LTD., New Taipei (TW)

( * ) Notice: Subject to any disclaimer, the term of this patent is extended or adjusted under 35 U.S.C. 154(b) by 92 days.

(21) Appl. No.: 15/597,515

(22) Filed: May 17, 2017

(65) Prior Publication Data
US 2017/0332598 A1 Nov. 23, 2017

(30) Foreign Application Priority Data

May 20, 2016 (CN) .................... 2016 2 0466679 U

(51) Int. Cl.
| | |
|---|---|
| *B60R 21/02* | (2006.01) |
| *B60R 5/04* | (2006.01) |
| *A01K 1/02* | (2006.01) |
| *E06B 9/02* | (2006.01) |
| *E06B 9/00* | (2006.01) |
| *E06B 9/01* | (2006.01) |

(52) U.S. Cl.
CPC .......... *B60R 21/026* (2013.01); *A01K 1/0272* (2013.01); *B60R 5/04* (2013.01); *E06B 9/02* (2013.01); *E06B 2009/002* (2013.01); *E06B 2009/015* (2013.01)

(58) Field of Classification Search
CPC ....... A01K 1/0272; E06B 9/06; E06B 9/0607; E06B 2009/02; E06B 2009/002; E06B 2009/015; B60R 21/026; E04G 7/14
See application file for complete search history.

(56) References Cited

U.S. PATENT DOCUMENTS

| | | | | |
|---|---|---|---|---|
| 1,706,214 | A * | 3/1929 | Davidson | .................. E04G 7/14 403/385 |
| 4,895,471 | A * | 1/1990 | Geltz | ........................ F16B 7/14 211/105.3 |
| 6,370,823 | B1 * | 4/2002 | Andersen | ............. A01K 1/0017 49/57 |

(Continued)

FOREIGN PATENT DOCUMENTS

GB 2078180 A * 1/1982 ........... B60R 21/026

*Primary Examiner* — Marcus Menezes

(74) *Attorney, Agent, or Firm* — Birch, Stewart, Kolasch & Birch, LLP

(57) ABSTRACT

A retraction barrier can abut objects in the environment for safeguarding. The retraction barrier has multiple longitudinal poles separate from each other and multiple lateral poles separate from each other. The longitudinal poles are connected with the longitudinal poles so that the retraction barrier forms a grid, making the retraction barrier capable of isolating something. The longitudinal poles and lateral poles are each a retractable pole. Lengths of the longitudinal poles and the lateral poles can be changed so that each end of the longitudinal poles and the lateral poles can abut an object in the environment, so the retraction barrier can be secured with objects of any dimensions and shapes. For storage of the retraction barrier, the lateral poles and the longitudinal poles are retracted, so that the volume of the retraction barrier is lessened for ease in carriage.

13 Claims, 9 Drawing Sheets

(56) References Cited

U.S. PATENT DOCUMENTS

| | | | | |
|---|---|---|---|---|
| 6,799,534 B1* | 10/2004 | Wang | ............... | B60R 21/06 |
| | | | | 119/412 |
| 8,827,587 B2* | 9/2014 | Didehvar | ............ | A47H 1/022 |
| | | | | 211/105.3 |
| 8,960,456 B2* | 2/2015 | Didehvar | ............. | A47K 3/38 |
| | | | | 211/105.4 |
| 9,434,338 B2* | 9/2016 | Link | ............. | A01K 1/0272 |
| 9,822,807 B2* | 11/2017 | Link | ............. | F16B 5/0004 |
| 2003/0057722 A1* | 3/2003 | Dolman | ............. | B60R 21/026 |
| | | | | 296/24.43 |
| 2007/0210597 A1* | 9/2007 | Wang | ............... | B60R 21/06 |
| | | | | 296/24.43 |
| 2009/0256377 A1* | 10/2009 | Beechie | ............. | B60R 21/026 |
| | | | | 296/24.46 |
| 2010/0170170 A1* | 7/2010 | Quick | .............. | E05C 19/003 |
| | | | | 52/202 |
| 2012/0255234 A1* | 10/2012 | Wang | ............... | E05B 65/0007 |
| | | | | 49/395 |
| 2017/0067284 A1* | 3/2017 | Wang | ............... | E06B 9/02 |

\* cited by examiner

RETRACTION BARRIER

CROSS-REFERENCE TO RELATED APPLICATIONS

This application is based upon and claims priority under 35 U.S.C. 119 from China Patent Application No. 201620466679.8 filed on May 20, 2016, which is hereby specifically incorporated herein by this reference thereto.

BACKGROUND OF THE INVENTION

1. Field of the Invention

The present invention relates to a security product, especially to a retraction barrier.

2. Description of the Prior Arts

With the advance of living standards, more and more families buy sport utility vehicles, i.e., SUV for convenience for traveling, because the SUV has large accommodation space for luggage and other belongings. However, when people travel with a pet on the vehicle, such as a dog or a cat, the pet may go across the seats and disturb the driver. In addition, if the stuff in the accommodation space of the vehicle is too much and is stacked up higher than the seats, the stuff may fall down on the seat during the ride, which is dangerous. Thus, how to set apart the pet or the stuff behind the seats needs to be resolved.

SUMMARY OF THE INVENTION

The main objective of the present invention is to provide a retraction barrier that can be used for safeguarding.

The retraction barrier has a plurality of longitudinal poles and a plurality of lateral poles. The longitudinal poles are spaced apart from each other. The lateral poles are spaced apart from each other and connected with the longitudinal poles. The longitudinal poles and the lateral poles are retractable poles, and ends of the longitudinal poles and the lateral poles are capable of abutting objects in the environment.

Other objectives, advantages and novel features of the invention will become more apparent from the following detailed description when taken in conjunction with the accompanying drawings.

DETAILED DESCRIPTION OF THE PREFERRED EMBODIMENTS

A retraction barrier in accordance with the present invention is capable of abutting an object in the environment for safeguarding. One application example of the retraction barrier is that the retraction barrier is mounted behind seats of a vehicle, e.g. an SUV, which isolates the pets at a rear portion of the vehicle and prevents the pet from going across the seats.

Figure 1:
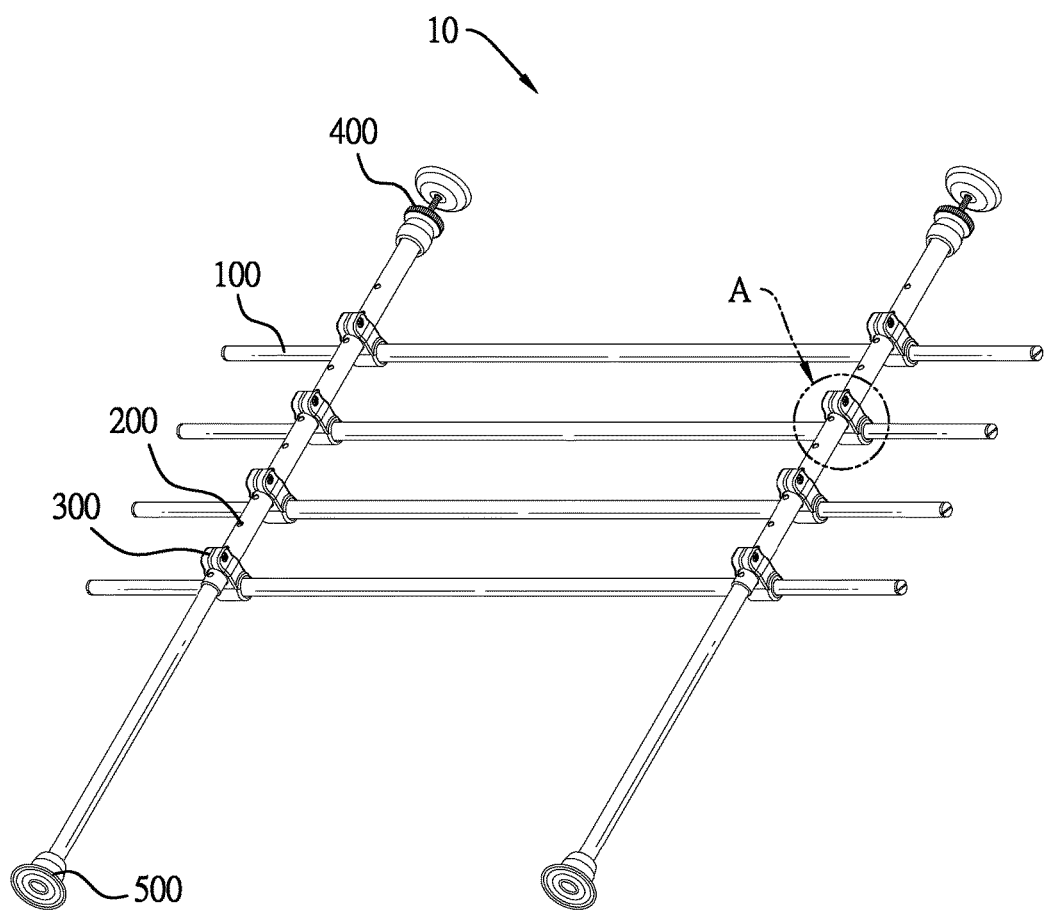
FIG. 1 is a perspective view of a retraction barrier in accordance with a first embodiment of the present invention.

With reference to FIG. 1, the retraction barrier 10 in accordance with a first embodiment of the present invention comprises a plurality of lateral poles 100 and a plurality of longitudinal poles 200. The longitudinal poles 200 are separate from each other, and the lateral poles 100 are also separate from each other. The lateral poles 100 and the longitudinal poles 200 are across each other to form a grid. Each one of the longitudinal poles 200 and the lateral poles 100 is a retractable pole. The longitudinal poles 200 can abut on a roof and a floor of the vehicle and the lateral poles 100 can abut on two lateral walls of the vehicle so that the retraction barrier 10 is fixed at a rear portion of the vehicle.

When the retraction barrier 10 of the present invention is in use, a length of each one of the lateral poles 100 and the longitudinal poles 200 should be adjusted to suit the environment, i.e., the dimensions or shape of an interior of the vehicle. After use, the lateral poles 100 and the longitudinal poles 200 can be retracted and shortened, which lessens a volume of the retraction barrier 10 for ease in carriage.

In this disclosure, the "lateral" is defined by a right and left direction of a human being, and the "longitudinal" is defined by an up and down direction of a human being in a standing posture.

Figure 2:
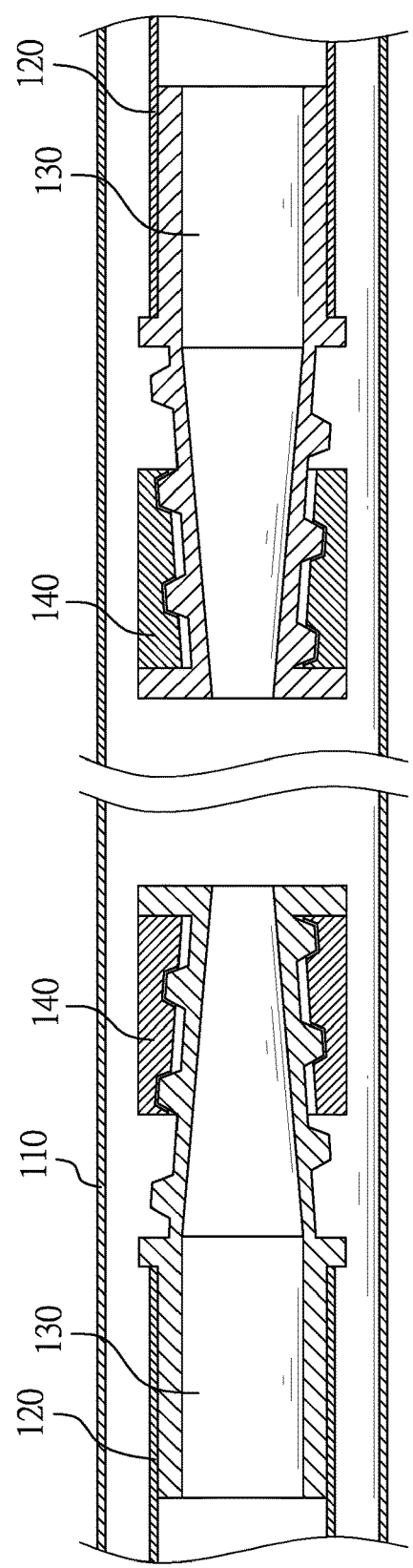
FIG. 2 is a perspective view of a first rod and a second rod of a lateral pole of the retraction barrier in FIG. 1, shown with the first and second rods connected.
Figure 3:
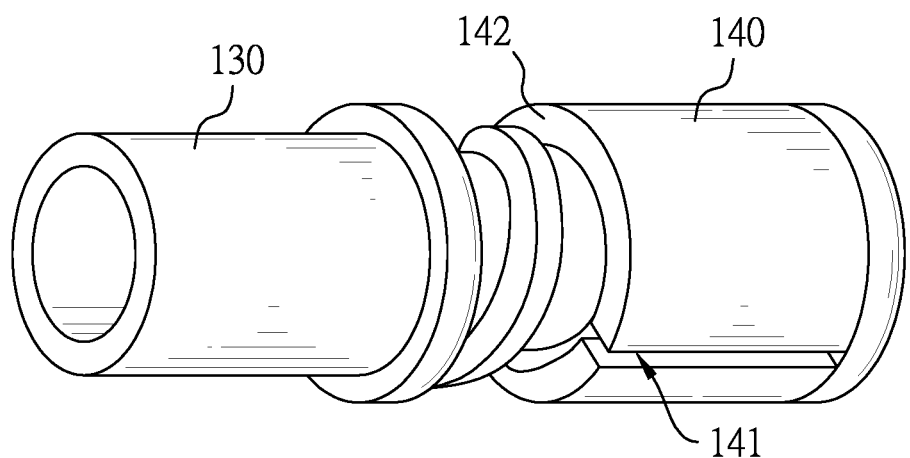
FIG. 3 is a perspective view of a securing component and a securing ring of the retraction barrier in FIG. 1.

Please also refer to FIGS. 2 and 3. In this embodiment, each one of the lateral poles 100 comprises a first rod 110, a second rod 120, a securing component 130, and a securing ring 140. The first rod 110 is slidably sleeved on the second rod 120, which makes the lateral pole 100 capable of being shortened or extended. The securing component 130 is securely mounted at an end of the second rod 120, and that end of the second rod 120 is mounted in the first rod 110. The securing ring 140 forms inner threads and the securing component 130 forms outer threads so that the securing ring 140 is capable of being sleeved on and screwed with the securing component 130. The securing component 130 is conical in shape. The securing ring 140 comprises a first gap 141. The first gap 141 is formed through an inner surface and an outer surface of the securing ring 140 and extends in an axial direction of the securing ring 140 from an end surface of the securing ring 140 that is adjacent to the securing component 130. When the second rod 120 is rotated, the securing component 130 is driven to rotate with respect to the securing ring 140, which causes an end of the securing component 130 with a larger diameter to move toward the securing ring 140, so that the first gap 141 is forced to open and makes a diameter of the securing ring 140 become larger and an outer surface of the first gap 141 abut an inner surface of the first rod 110. Thus, a location of the second rod 120 with respect to the first rod 110 is determined and fixed.

When the retraction barrier 10 is in use, the first rods 110 and the second rods 120 should be adjusted to make the lateral poles 100 in a suitable length and then the second rods 120 and the first rods 110 are fixed by rotating the second rods 120.

Precisely, the securing ring 140 comprises a thickened portion 142. The thickened portion 142 is formed opposite the first gap 141 so that a thickness of the thickened portion 142 of the securing ring 140 is larger than that of other portions of the securing ring 140 adjacent to the first gap 14, which increases a strength of the thickened portion 142 and prevents the securing ring 140 from breaking when the securing ring 140 is opened.

In another embodiment, the first rod 110 and the second rod 120 may be fixed by a cam tightened therein. For example, the securing component 130 comprises a shaft, and the securing ring 140 is securely sleeved on the shaft. An axis of the shaft deviates from axes of the securing component and the securing ring. When the securing component 130 is rotated with respect to the shaft, the securing component 130 and the securing ring 140 abut on two opposite portions of the inner surface of the first rod 110, which determines and fixes the location of the second rod 120 with respect to the first rod 110.

In the first embodiment, a number of the second rod 120 is two and a number of the first rod 110 is one. The first rod 110 is mounted between the two second rods 120. Each one of the two second rods 120 comprises the securing component 130 and the securing ring 140.

However, the numbers of the first rod 110 and the second rod 120 are not limited thereto. The multiple first rods 110 and the multiple second rods 120 may be mounted alternately, and each adjacent first rod 110 and second rod 120 are fixed through the securing component 130 and the securing ring 140.

Therefore, the second rod 120 can be fixed on or move with respect to the first rod 110 after the second rod 120 is rotated, which further makes a length of the lateral pole 100 easily adjustable and thus a structure of the lateral pole 100 is simplified.

Figure 4A:
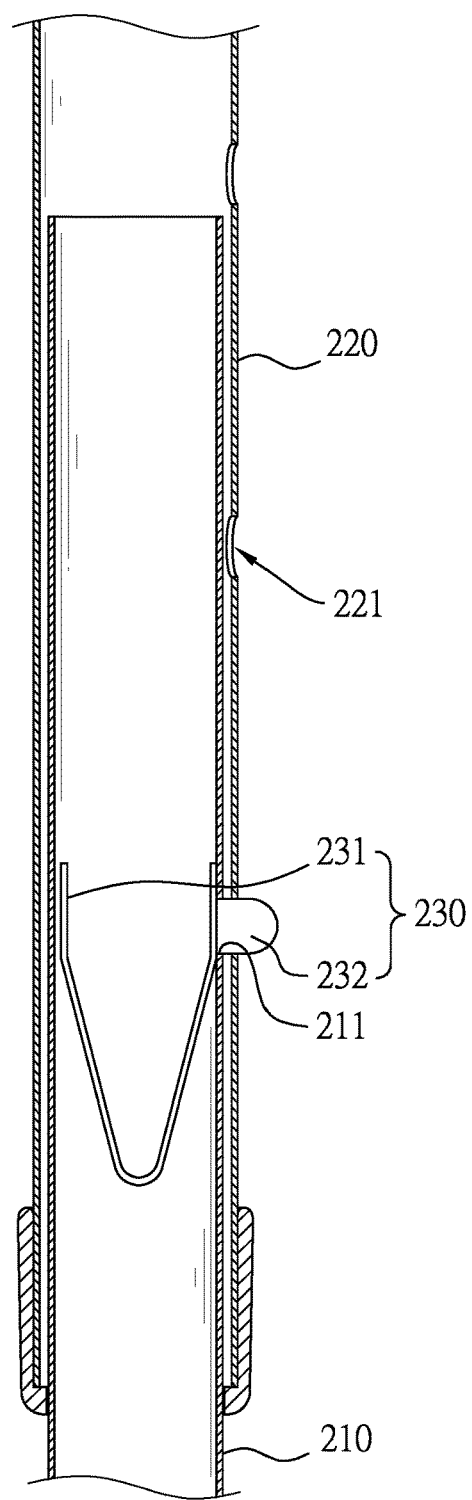
FIG. 4A is a sectional view of an inner tube and an outer tube of a longitudinal pole of the retraction barrier in FIG. 1, shown with the inner and outer tubes connected.

Please refer to FIGS. 1 and 4A. In this embodiment, each one of the longitudinal poles 200 comprises an inner tube 210, an outer tube 220, and an engaging component 230. The outer tube 220 is sleeved on the inner tube 210. The outer tube 220 forms a plurality of holes 221. The engaging component 230 is mounted on the inner tube 210 and abuts an inner surface of the outer tube 220. After the inner tube 210 and the outer tube 220 are moved with respect to each other, the engaging component 230 can match one of the holes 221 and then fixes the outer tube 220 and the inner tube 210.

Precisely, the engaging component 230 is V-shaped and is elastic. The engaging component 230 comprises a first free end 231 and a second free end 232 opposite each other. The first free end 231 abuts the inner surface of the inner tube 210. The second free end 232 is mounted through a recess 211 on a side wall of the inner tube 210 and abuts the inner surface of the outer tube 220. When the second free end 232 is pressed down, the second free end 232 abuts the inner surface of the outer tube 220. Meanwhile, the outer tube 220 and the inner tube 210 can be moved with respect to each other, so that a length of each one of the longitudinal poles 200 can be adjusted.

Figure 4B:
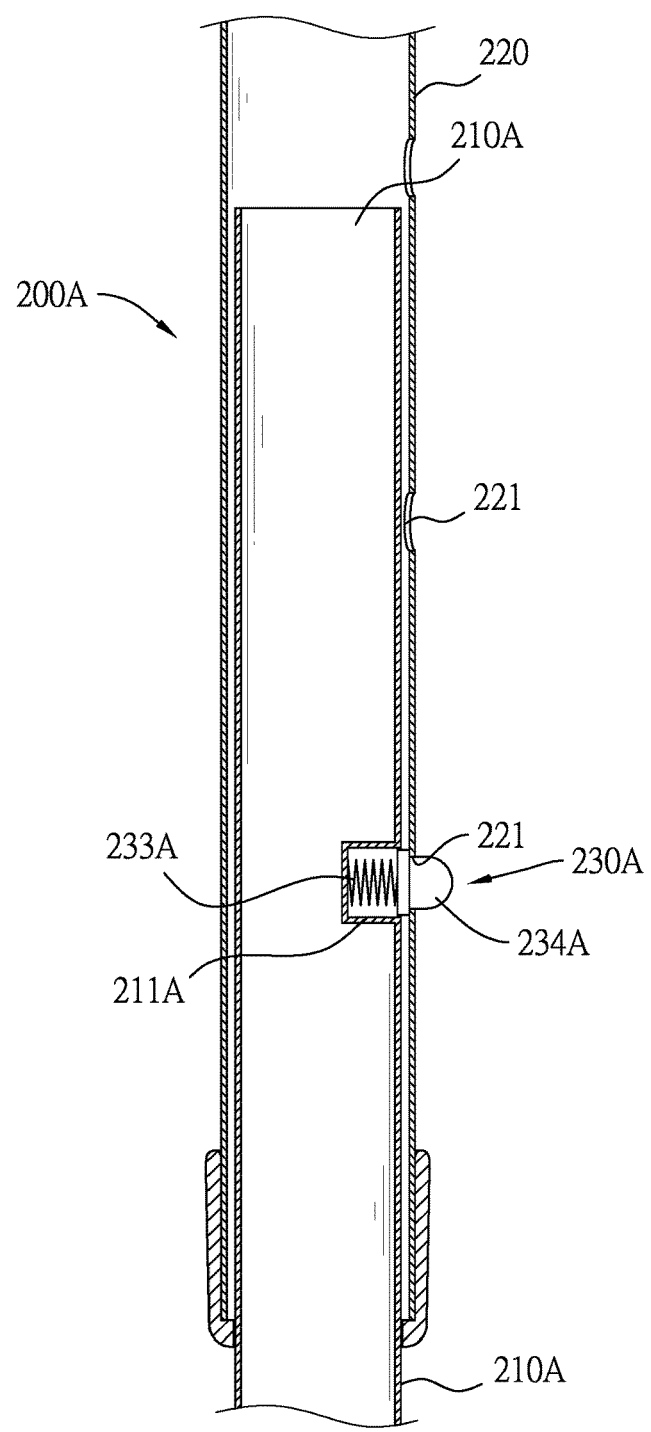
FIG. 4B is a sectional view of the connected inner tube and outer tube of a longitudinal pole of the retraction barrier in accordance with a second embodiment of the present invention.

Please refer to FIG. 4B. In a second embodiment of the longitudinal pole 200A of the retraction barrier, the inner tube 210A of the longitudinal pole 200A comprises a recess 211A. The recess 211A is formed on an outer surface of the inner tube 210A. The engaging component 230A is disposed in the recess 211A and comprises an elastic portion 233A and a protrusion 234A. The protrusion 234A is mounted on the elastic portion 233A so that the elastic force of the elastic portion 233A can be exerted on the protrusion 234A, which causes the protrusion 234A to match one of the holes 221 of the outer tube 220. After the protrusion 234A is pressed, a length of the elastic portion 233A is lessened so that the protrusion 234A moves into the recess 211A and is capable of abutting the inner surface of the outer tube 220, which causes the outer tube 220 and the inner tube 210 to be moveable with respect to each other.

Therefore, each one of the longitudinal poles 200 is capable of changing length fast, and a structure thereof is simple.

Figure 5:
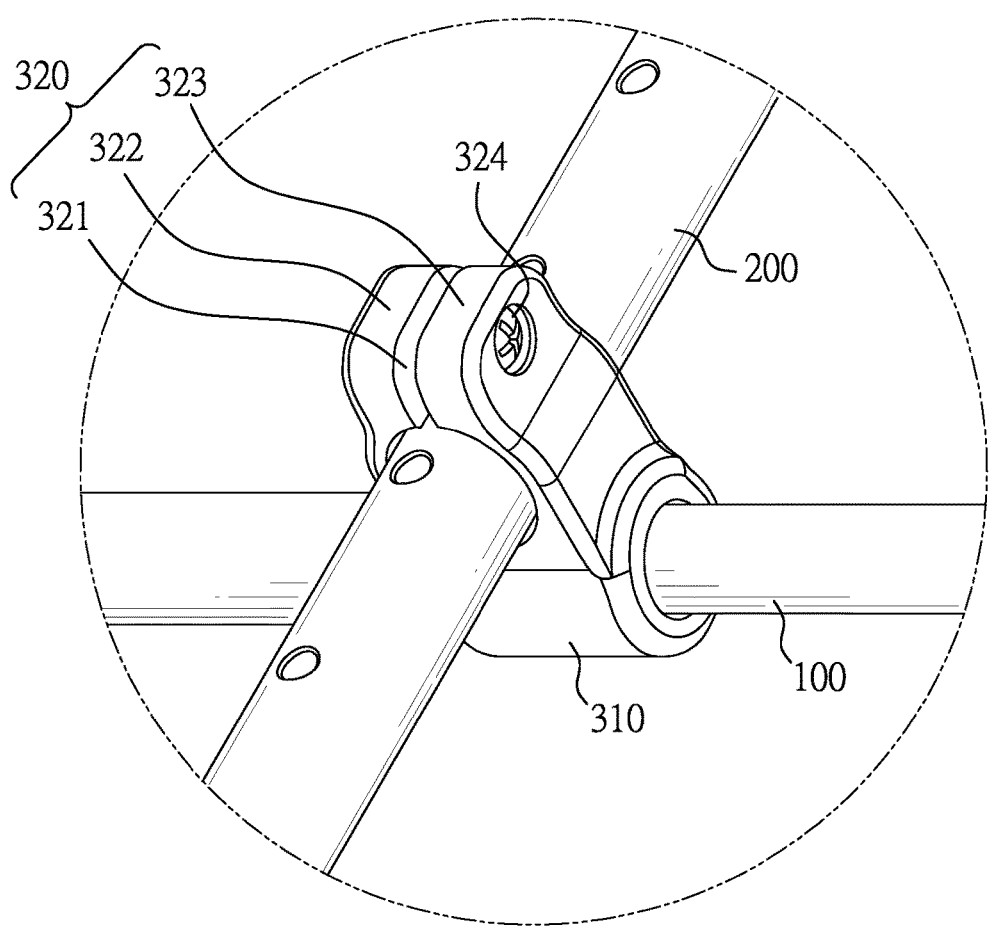
FIG. 5 is an enlarged view of the encircled area A in FIG. 1.

Please refer to FIGS. 1 and 5. In the first embodiment, the retraction barrier 10 further comprises a plurality of fixing components 300 for connecting the lateral poles 100 and the longitudinal poles 200. Each one of the fixing components 300 comprises a first fixing body 310 and a second fixing body 320. The second fixing body 320 is mounted on the first fixing body 310. The first fixing body 310 and the second fixing body 320 are tubular in shape. The second fixing body 320 forms a second gap 321. The second gap 321 extends in an axial direction of the second fixing body 320 and through two end surfaces of the second fixing body 320. The second gap 321 divides the second fixing body 320 into a first clamp portion 322 and a second clamp portion 323, which are on two sides of the second gap 321. One of the longitudinal poles 200 is mounted through the second fixing body 320, and a threaded fixer 324 is mounted through the first clamp portion 322 and the second clamp portion 323 for clamping the longitudinal pole 200, which causes the fixing component 300 to be fixed on the longitudinal pole 200.

Moreover, the multiple longitudinal poles 200 are fixed with the multiple fixing components 300 respectively, and one lateral pole 100 is mounted in the first fixing bodies 310 of the fixing components 300.

Precisely, two first fixing bodies 310 of two fixing components 300 are sleeved on two ends of the first rod 110. The second fixing bodies 320 of the fixing components 300 are sleeved on the outer tubes 220 of two longitudinal poles 200. Meanwhile, the first rod 110 and the outer tube 220 are kept in position so that the lengths of the lateral poles 100 and the longitudinal poles 200 can be changed by adjusting the second rods 120 and the inner tubes 210. When a position of one of the fixing bodies 320 with respect to the outer tube 220 is adjusted, the threaded fixer 324 should be rotated first, and thereby the outer tube 220 is released by the first clamp portion 322 and the second clamp portion 323, which allows the position of the fixing body 320 with respect to the outer tube 220 to be adjustable. Thus, a distance between the adjacent two first rods 110 can be changed.

In another embodiment, the longitudinal poles 200 may be mounted in the first fixing bodies 310 and the lateral poles 100 are secured through the second fixing bodies 320.

Please refer to FIGS. 1 and 2. In the first embodiment, the retraction barrier 10 further comprises a plurality of adjusting mechanisms 400. Each one of the adjusting mechanisms 400 is mounted on one end of a respective one of the longitudinal poles 200 and comprises an adjusting button 410, an adjusting screw rod 420, and a tightening sleeve 430.

The tightening sleeve 430 is securely sleeved on the end of the longitudinal pole 200. The adjusting screw rod 420 comprises a screw rod 421 and a cap 422 mounted on the screw rod 421. One end of the screw rod 421 is mounted through the adjusting button 410 and the tightening sleeve 430, wherein that end of the screw rod 421 is distal from the cap 422. The screw rod 421 and the adjusting button 410 are screwed with each other. When the adjusting button 410 is rotated, a length of the screw rod 421 out of the adjusting button 410 is increased so that the cap 422 abuts on the roof of the vehicle. When the adjusting button 410 is rotated in an inverse direction, the length of the screw rod 421 out of the adjusting button 410 is decreased so that the cap 422 departs from the roof of the vehicle.

With the adjusting mechanisms 400, the retraction barrier 10 can be slightly adjusted with respect to the roof of the vehicle, so that the retraction barrier 10 can abut on the roof and secure the retraction barrier 10 itself. Therefore, the retraction barrier 10 can be installed or removed fast through the simple adjusting mechanisms 400.

In addition, one end of each one of the multiple longitudinal poles 200 is mounted with one adjusting mechanism 400, so the retraction barrier 10 can suit the roof of the vehicle through the adjusting mechanisms 400.

Figure 6:
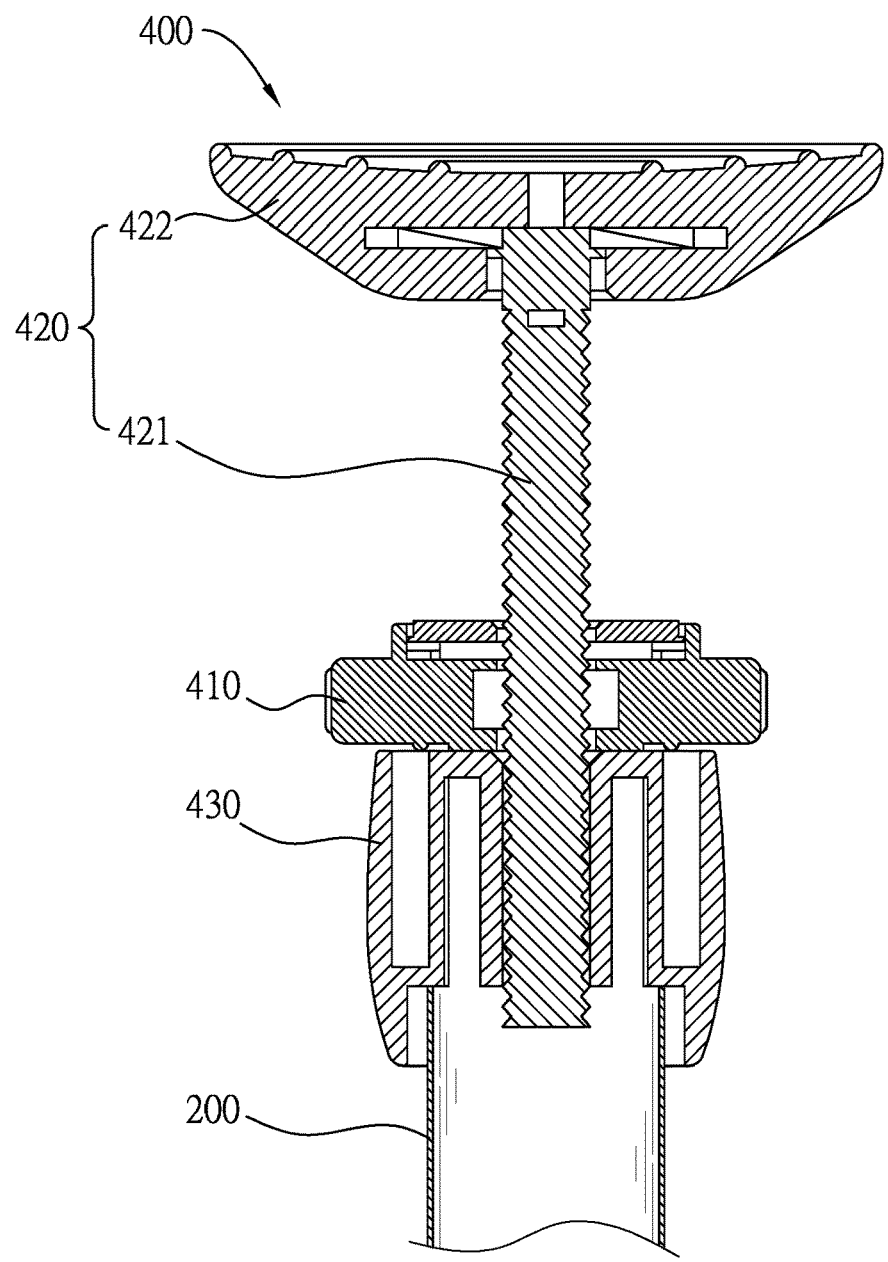
FIG. 6 is a sectional view of the adjusting mechanism of the retraction barrier in FIG. 1.
Figure 7:
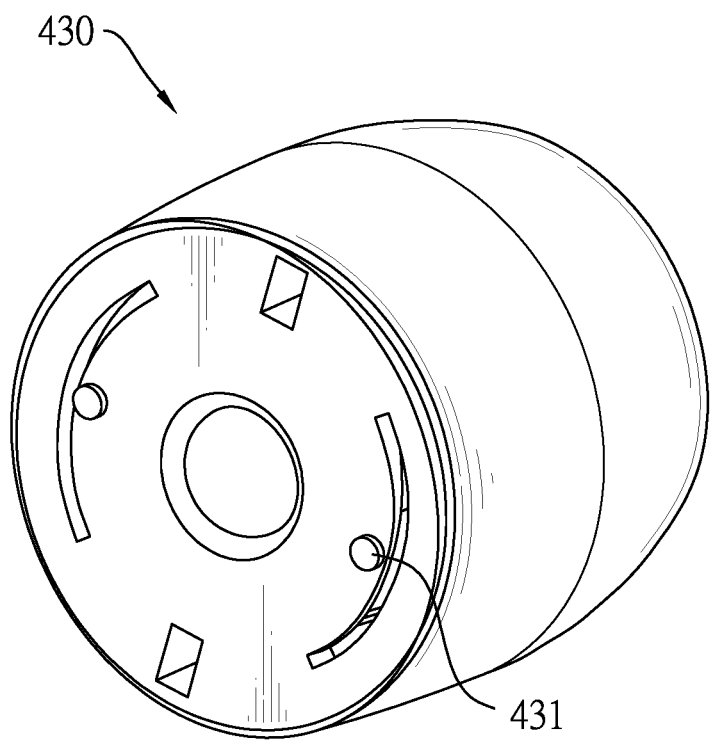
FIG. 7 is a perspective view of a tightening sleeve of the adjusting mechanism in FIG. 6.
Figure 8:
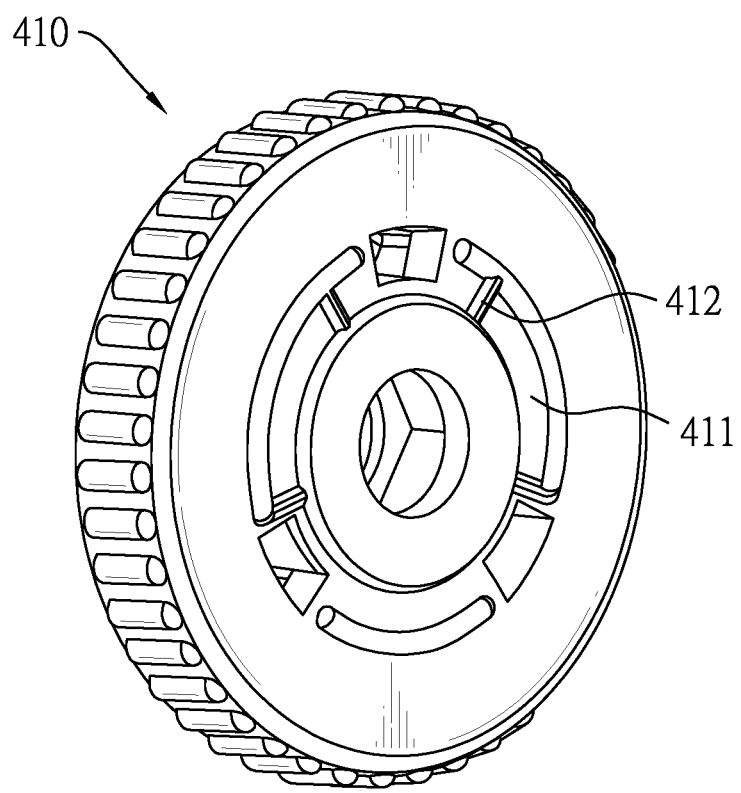
FIG. 8 is a perspective view of an adjusting button of the adjusting mechanism in FIG. 6.

Please refer to FIGS. 6, 7 and 8. The tightening sleeve 430 comprises two projections 431 on an end surface of the tightening sleeve 430, and that end surface of the tightening sleeve 430 faces the adjusting button 410. Besides, the adjusting button 410 forms an annular groove 411 on a surface of the adjusting button 410, and that surface of the adjusting button 410 faces the tightening sleeve 430. The annular groove 411 is coaxial with the screw rod 421 and comprises a plurality of ribs 412. The ribs 412 extend respectively in radial directions in the annular groove 411 so that the annular groove 411 is divided into a plurality of sector areas. The ribs 412 are capable of abutting the projections 431 and restricting the projections 431 in the sector areas. With less external force, when the cap 422 abuts on the roof of the vehicle, the adjusting button 410 only can be rotated in one of the sector areas between the two adjacent ribs 412, which prevents the adjusting button 410 from being rotated significantly by accident or in violent vibration, so that the length of the screw rod 421 may not be changed and the cap 422 may not depart from the roof of the vehicle.

In another embodiment, each adjusting mechanism 410 may not have the tightening sleeve 430. In this circumstance, the screw rod 421 is mounted through an end of one longitudinal pole 200 and the projections 431 are mounted on end surfaces of the longitudinal poles 200.

In another embodiment, the adjusting mechanism 400 may be mounted on one end of each one of the lateral poles 100 for the same purpose.

Please refer to FIG. 1 again. In the first embodiment, an end of each longitudinal pole 200 distal from the adjusting mechanism 400 is mounted with a mat 500. The mat 500 is capable of abutting a floor of the vehicle. The mat 500 may be made from elastic plastic, which increases a friction between the mat 500 and the floor and thereby a stability of the retraction barrier 10 is enhanced.

In addition, the retraction barrier 10 can be mounted not only behind seats of a vehicle, but also on any other object in the environment, e.g. a frame of a door, and it is not limited thereto.

The retraction barrier 10 has multiple longitudinal poles 200 and multiple lateral poles 100 mounted across each other so that the retraction barrier 10 is a grid for isolating pets. Furthermore, the lengths of the lateral poles 100 and the longitudinal poles 200 are adjustable, such that the retraction barrier 10 can be mounted and suit different dimensions or shapes of the objects in the environment and thereby applicability of the retraction barrier 10 is improved. For storage of the retraction barrier 10, the length of the lateral poles 100 and the longitudinal poles 200 can be retracted, so that the volume is lessened, which facilitates easy carriage of the retraction barrier 10.

Moreover, with the lengths of the lateral poles 100 rapidly adjusted through the securing component 130 and the securing ring 140 and the lengths of the longitudinal poles 200 rapidly adjusted through the engaging component 230, the retraction barrier 10 can be installed and removed without any tool.

Besides, with the adjusting mechanisms 400, the longitudinal poles 200 can be slightly adjusted with respect to the environment, which enhances the stability of the retraction barrier 10.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the teiins in which the appended claims are expressed.

What is claimed is:

1. A retraction barrier for abutting objects in an environment, the retraction barrier comprising:
    a plurality of longitudinal poles spaced apart from each other;
    a plurality of lateral poles spaced apart from each other and connected with the longitudinal poles;
    at least one adjusting mechanism mounted on an end of at least one of the lateral poles or an end of one of the longitudinal poles, each one of the at least one adjusting mechanism comprising:
        an adjusting wheel comprising:
            an annular groove formed on a surface of the adjusting wheel and comprising:
                a plurality of ribs extending in radial directions and dividing the annular groove into a plurality of sector areas;
        wherein each one of the at least one adjusting mechanism further comprises an adjusting screw rod
            a screw rod screwed with the adjusting wheel, one end of the screw rod mounted through the adjusting wheel; the screw rod being coaxial with the annular groove; and
            a cap mounted on another end of the screw rod;
        wherein each one of the at least one adjusting mechanism further comprises a tightening sleeve securely mounted on the end of the lateral pole or the end of the longitudinal pole, sleeved on the screw rod; the surface of the adjusting wheel on which the annular groove is formed facing the tightening sleeve; the tightening sleeve comprising:
            at least one projection formed at an end surface of the tightening sleeve, said end surface of the tightening sleeve facing the adjusting wheel; the ribs abutting the at least one projection and restricting the at least one projection in the sector areas;
    wherein the longitudinal poles and the lateral poles are retractable poles, and ends of the longitudinal poles and ends of the lateral poles are capable of abutting the objects in the environment;
    wherein when the adjusting wheel is rotated, a length of the screw rod extending out of the adjusting wheel is changed.

2. The retraction barrier as claimed in claim 1, wherein each one of the lateral poles comprises:
- at least one first rod;
- at least one second rod movably sleeved in the at least one first rod, thereby each lateral pole being telescopic;
- at least one securing component being conical in shape and securely mounted on an end of the at least one second rod, the end of the at least one second rod mounted in the at least one first rod, and the at least one securing component each forming outer threads;
- at least one securing ring sleeved on the at least one securing component and each one of the at least one securing ring comprising:
  - inner threads, and thereby the at least one securing ring screwed with the at least one securing component; and
  - a first gap formed through an inner surface and an outer surface of the at least one securing ring in an axial direction of the at least one securing ring;
- wherein when the at least one second rod is rotated, the at least one securing component is driven to rotate with respect to the at least one securing ring and thereby the first gap is opened, so that the at least one securing ring abuts an inner surface of the at least one first rod.

3. The retraction barrier as claimed in claim 2, wherein each one of the at least one securing ring further comprises:
- a thickened portion formed opposite the first gap.

4. The retraction barrier as claimed in claim 2, wherein the at least one first rod includes a plurality of first rods; the at least one second rod includes a plurality of second rods; the at least one securing component includes a plurality of securing components; the at least one securing ring includes a plurality of securing rings; the first rods and the second rods are alternately mounted on each other, and each one of the adjacent first rod and second rod are connected by one of the securing components and one of the securing rings.

5. The retraction barrier as claimed in claim 3, wherein the at least one first rod includes a plurality of first rods; the at least one second rod includes a plurality of second rods; the at least one securing component includes a plurality of securing components; the at least one securing ring includes a plurality of securing rings; the first rods and the second rods are alternately mounted on each other, and each one of the adjacent first rod and second rod are connected by one of the securing components and one of the securing rings.

6. The retraction barrier as claimed in claim 1, wherein the retraction barrier comprises:
- a fixing component comprising:
  - a first fixing body being a tube and sleeved on one of the lateral poles;
  - a second fixing body being a tube, mounted on the first fixing body, sleeved on one of the longitudinal poles, and comprising:
    - a second gap formed through two end surfaces of the second fixing body in an axial direction of the second fixing body;
    - a first clamp portion on one side of the second gap;
    - a second clamp portion on another side of the second gap; and
    - a threaded fixer securely screwed in the first clamp portion and the second clamp portion, so that the respective longitudinal pole or the respective lateral pole is clamped securely.

7. The retraction barrier as claimed in claim 5, wherein the retraction barrier comprises:
- a fixing component comprising:
  - a first fixing body being a tube and sleeved on one of the lateral poles;
  - a second fixing body being a tube, mounted on the first fixing body, sleeved on one of the longitudinal poles, and comprising:
    - a second gap formed through two end surfaces of the second fixing body in an axial direction of the second fixing body;
    - a first clamp portion on one side of the second gap;
    - a second clamp portion on another side of the second gap; and
    - a threaded fixer securely screwed in the first clamp portion and the second clamp portion, so that the respective longitudinal pole or the respective lateral pole is clamped securely.

8. The retraction barrier as claimed in claim 1, wherein each one of the longitudinal poles comprises:
- an inner tube;
- an outer tube sleeved on the inner tube and forming:
  - a plurality of holes;
- an engaging component mounted on the inner tube and abutted on an inner surface of the outer tube;
- wherein the inner tube and the outer tube are moved with respect to each other until the outer tube and the inner tube are secured by the engaging component mounted through one of the holes.

9. The retraction barrier as claimed in claim 7, wherein each one of the longitudinal poles comprises:
- an inner tube;
- an outer tube sleeved on the inner tube and forming:
  - a plurality of holes;
- an engaging component mounted on the inner tube and abutted on an inner surface of the outer tube;
- wherein the inner tube and the outer tube are moved with respect to each other until the outer tube and the inner tube are secured by the engaging component mounted through one of the holes.

10. The retraction barrier as claimed in claim 8, wherein:
the engaging component is V-shaped, is elastic, and comprises:
- a first free end abutted on an inner surface of the inner tube; and
- a second free end opposite the first free end, passing through a side wall of the inner tube, and mounted through one of the holes.

11. The retraction barrier as claimed in claim 9, wherein:
the engaging component is V-shaped, is elastic, and comprises:
- a first free end abutted on an inner surface of the inner tube; and
- a second free end opposite the first free end, passing through a side wall of the inner tube, and mounted through one of the holes.

12. The retraction barrier as claimed in claim 8, wherein:
the inner tube comprises:
- a recess, the engaging component mounted in the recess; and
the engaging component comprises:
- an elastic portion;
- a protrusion mounted on the elastic portion, and the elastic portion driving the protrusion to be mounted through said one of the holes.

13. The retraction barrier as claimed in claim 9, wherein:
the inner tube comprises:
- a recess, the engaging component mounted in the recess; and
the engaging component comprises:

an elastic portion;
a protrusion mounted on the elastic portion, and the elastic portion driving the protrusion to be mounted through said one of the holes.

* * * * *